United States Patent
Kieslich

(10) Patent No.: US 10,480,079 B2
(45) Date of Patent: Nov. 19, 2019

(54) ELECTROPLATINGLY DECORATED COMPONENT COMPRISING SYMBOLS OR A STRUCTURE INTRODUCED INTO THE SURFACE, AND METHOD FOR THE PRODUCTION THEREOF

(71) Applicant: Gerhardi Kunststofftechnik GmbH, Luedenscheid (DE)

(72) Inventor: Dirk Kieslich, Plettenberg (DE)

(73) Assignee: Gerhardi Kunststofftechnik GmbH, Luedenscheid (DE)

( * ) Notice: Subject to any disclaimer, the term of this patent is extended or adjusted under 35 U.S.C. 154(b) by 451 days.

(21) Appl. No.: 15/101,619

(22) PCT Filed: Nov. 25, 2014

(86) PCT No.: PCT/EP2014/075486
§ 371 (c)(1),
(2) Date: Jun. 3, 2016

(87) PCT Pub. No.: WO2015/082250
PCT Pub. Date: Jun. 11, 2015

(65) Prior Publication Data
US 2016/0312366 A1    Oct. 27, 2016

(30) Foreign Application Priority Data
Dec. 4, 2013   (DE) .................... 20 2013 009 793 U

(51) Int. Cl.
*B32B 3/10* (2006.01)
*C23C 18/16* (2006.01)
(Continued)

(52) U.S. Cl.
CPC ...... *C23C 18/1653* (2013.01); *B29C 45/0053* (2013.01); *B41M 7/00* (2013.01);
(Continued)

(58) Field of Classification Search
None
See application file for complete search history.

(56) References Cited

U.S. PATENT DOCUMENTS 8,647,748 B2    2/2014   Goerich et al.
2011/0123766 A1*  5/2011   Sakagami ............... B32B 27/08
                                                428/141
(Continued)

FOREIGN PATENT DOCUMENTS

DE   102006042269 A1 *  3/2008   ............... C25D 5/02
DE   10 2010 053 165 A1   6/2012
(Continued)

OTHER PUBLICATIONS

Machine translation of DE-102006042269-A1 (Year: 2006).*
International Search Report of PCT/EP2014/075486, dated Feb. 2, 2015.

*Primary Examiner* — Christopher M Polley
(74) *Attorney, Agent, or Firm* — Collard & Roe, P.C.

(57) ABSTRACT

An electroplatingly decorated component is made using an injection-molding process and is provided with symbols or a structure introduced into the surface of the component, the component being made of a plastic material that can be electroplated. A method produces a component of this type.

3 Claims, 1 Drawing Sheet

Figure 1:
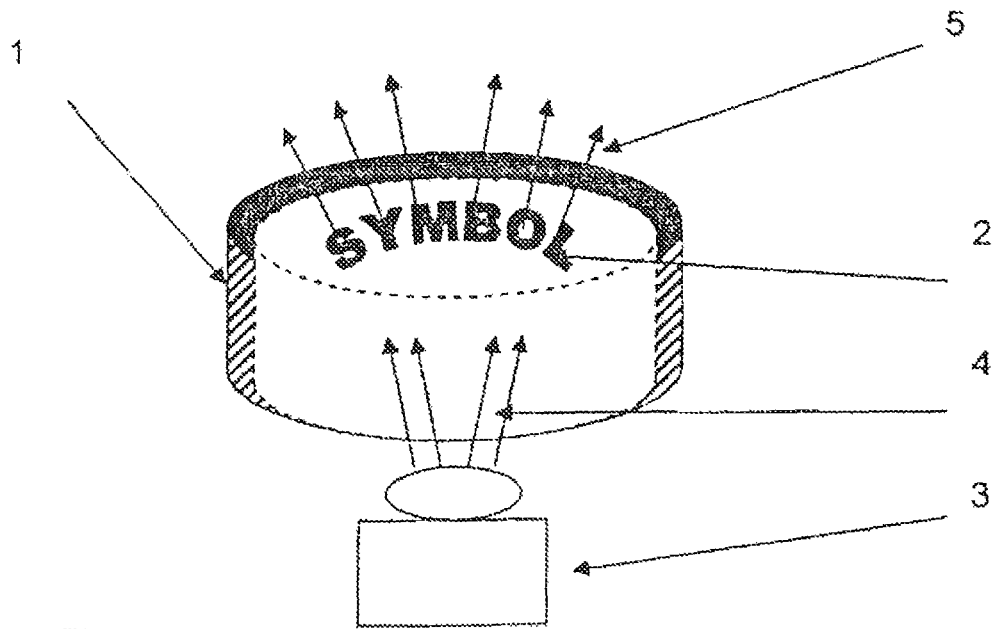

(51) Int. Cl.
  *B29C 45/00*   (2006.01)
  *B41M 7/00*   (2006.01)
  *B44C 1/22*   (2006.01)
  *B41M 5/24*   (2006.01)
  *B29K 55/02*   (2006.01)
  *B29L 9/00*   (2006.01)
  *B29L 31/30*   (2006.01)

(52) U.S. Cl.
  CPC .......... *B44C 1/228* (2013.01); *C23C 18/1605* (2013.01); *B29C 2045/0079* (2013.01); *B29K 2055/02* (2013.01); *B29L 2009/008* (2013.01); *B29L 2031/30* (2013.01); *B41M 5/24* (2013.01); *B41M 7/0009* (2013.01)

(56) References Cited

U.S. PATENT DOCUMENTS

2012/0067885 A1* 3/2012 Grings .............. B29C 45/14778
                                                                220/200
2015/0125701 A1   5/2015 Kieslich et al.

FOREIGN PATENT DOCUMENTS

WO    2008/017423 A2   2/2008
WO    2013/170912 A1   11/2013

\* cited by examiner

ELECTROPLATINGLY DECORATED COMPONENT COMPRISING SYMBOLS OR A STRUCTURE INTRODUCED INTO THE SURFACE, AND METHOD FOR THE PRODUCTION THEREOF

CROSS REFERENCE TO RELATED APPLICATIONS

This application is the National Stage of PCT/EP2014/075486 filed on Nov. 25, 2014, which claims priority under 35 U.S.C. § 119 of German Application No. 20 2013 009 793.0 filed on Dec. 4, 2013, the disclosures of which are incorporated by reference. The international application under PCT article 21(2) was not published in English.

The invention relates to a component decorated by electroplating, having a symbol or structure composed of plastic introduced into the surface, in which the component is produced from a plastic that can be electroplated, using the injection-molding method. The invention furthermore relates to a method for the production of such a component.

In the case of components composed of plastic for the automotive industry, of the type being considered here, these are essentially operating elements with which various functions of the automobile can be operated. These include, for example, start/stop buttons, operating elements for vehicle lighting or climate control. The said components have in common that they have a symbol or words or the like, which describe the respective function. This symbol is configured to have a different color from the rest of the operating element. Demands on the symbol are, for example, good contrast in comparison with the operating element itself and the ability to be backlit.

Various methods are known for the production of the aforementioned components composed of plastic. Thus, fox example, the PVD method (physical vapor deposition) is based on the metallization of an operating element produced from a plastic. In this regard, thin layers are deposited in a vacuum. The material to be deposited is present in solid form. The evaporated material moves through the vacuum chamber and impacts the components to be coated, where layer formation takes place. The desired symbol is burned in by means of a laser process and the PVD coating is partially removed. It is true that the PVD method is suitable for applying the desired symbol to the components. However, it has proven to be problematical that the symbol produced from metal does not demonstrate sufficient strength against wear and corrosion without an additional protective layer. For this reason, it is necessary to apply a protective layer, for example composed of varnish. However, the costs are increased by this additional work step.

Furthermore, methods are known in which the components are coated by being electroplated. In this regard, the parts are first produced using the injection-molding method, for example from ABS or ABS/PC. After the injection-molding procedure, the components are pretreated by being electroplated, in order to produce a thin metal layer. The components are then removed from the electroplating process. After removal, the electroplated metal layer is removed in certain regions, by means of a laser. The components treated in this manner are then passed to the electroplating process once again and deposition is continued until the desired chrome layer has been formed. The lasered regions then form the symbol. It is true that it is possible, using the said methods, to produce technically and optically high-quality operating elements. However, the method has the disadvantage that for one thing, the additional work step of laser use for production of the symbol increases the costs. Furthermore, in the aforementioned method, two electroplating processes are required. In total, the method is not well suited for mass-production components because of the method sequences that exist.

This is where the invention wishes to provide a remedy. The invention is based on the task of making available a component decorated by electroplating, having a symbol or structure introduced into the surface, composed of plastic, which component is, on the one hand, cost-advantageous and also suitable for the production of mass-produced products, but on the other hand also makes the required wear resistance of the respective operating element available even without additional treatment.

According to the invention, this task is accomplished in that the component decorated by electroplating is produced using the injection-molding method and is provided with a symbol or structure introduced into the surface, and that the component is produced from a plastic that can be electroplated.

With the invention, a component decorated by electroplating, having a symbol or structure introduced into the surface, the one hand, and is also suitable for the production of mass-produced products, and on the other hand makes the required wear resistance of the respective operating elements available even without additional treatment.

In a further development of the invention, the rear side is configured to be uncoated and free of metal. As a result, the symbol is translucent, to the extent that the component is lighted by means of a suitable light source.

The task is furthermore accompli shed by means of a method for the production of a component decorated by electroplating, having a symbol or structure introduced into the surface, in which the component is produced from a plastic that can be electroplated, using the injection-molding method. As a result, a method for the preparation of a symbol or structure deposited by electroplating, in components composed of plastic, for the automotive industry, by means of electroplating is created, which method is significantly more cost-advantageous in comparison with the methods known from the state of the art. This is brought about in that only one electroplating process is required. Furthermore, interruption of the electroplating process for laser treatment of the components, as known from the state of the art, is not required, so that the electroplating can be carried out in a single, continuous procedure. In addition, it is possible to produce high-quality components, which also meet the demands with regard to wear, for example, can be produced using the method according to the invention.

In a further development of the invention, the symbol is applied using varnish that cannot be electroplated. The use of varnishes has the advantage that the most varied varnishes having different properties are available for processing, and, on the other hand, that any desired shapes for symbols, words or numbers can be depicted using the varnishes.

Preferably, the symbol is imprinted onto the component. Printing represents a simple method, particularly when using varnishes that cannot be electroplated for the production of the symbol, and furthermore, it can be well integrated into the remainder of the process sequence.

Particularly preferably, the print is applied after the injection-molding procedure of the component.

In an advantageous further development of the invention, the print is applied by means of pad printing. This is a method in which the injection-molded parts are set into a suitable apparatus. Furthermore, the print image is taken up by a soft punch, generally referred to as a pad, from an etched or milled hollowed-out varnish storage area, the cliché, which is filled with varnish and scraped off before every work cycle, and transferred to the plastic component.

Experience has shown that the transferred print images are sufficient for simple optical demands, but build up to form non-clean and non-sharp contours at the irregular boundary surfaces of the print during the subsequent electroplating step. In a further development of the invention, the contour of the symbol is therefore traced with a burning laser beam, following the contour here, and irregularities of the print image at the outer edges are removed. The components, which are subsequently electroplated, therefore demonstrate a clean edge progression between the deposited electroplating layer and the print image.

Figure 2:
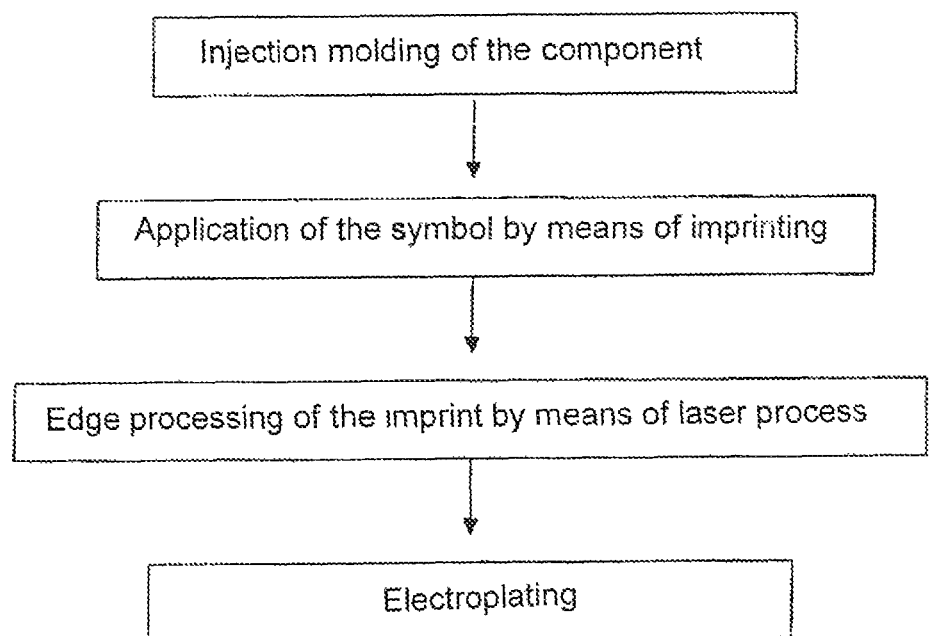

Other further developments and embodiments of the invention are indicated in the remaining dependent claims. An exemplary embodiment of the invention is shown in the drawings and will be described in detail below. The figures show:

FIG. 1 the schematic representation of an electroplated component composed of plastic, in the form of a start/stop button;

FIG. 2 the flow chart of a method according to the invention.

FIG. 1 shows a component 1 produced from plastic, for the automotive industry, with subsequent electroplating. The component 1 has a symbol 2 after completion of the method according to the invention, which symbol can involve not only numbers, words or the like, but also pictograms. In the exemplary embodiment according to FIG. 1, this is a start/stop button for an automobile, with which the engine of the automobile can be started and shut off. In this case, the symbol consists of the words "Start," "Stop," "Engine" or the like. If other operating elements are involved, the symbol is generally formed as a pictogram, for example the representation of a headlight, if an operating element for vehicle lighting is involved.

The rear side of the component 1 is configured to be uncoated and free of metal in the exemplary embodiment. The symbol 2 is thereby configured to be backlightable or translucent. If a light source 3 is disposed behind or under the component 1, which source emits light beams 4, as shown schematically in FIG. 1, the symbol 2 of the component 1 is backlit, as illustrated in FIG. 1 by the arrows indicated with "5." When driving during darkness, this backlightability—called "night design"—facilitates finding the respective operating element.

In the method sequence as shown in FIG. 2, first the component, to be produced from plastic, is produced using the injection-molding method. The plastic is a plastic that can be electroplated, preferably ABS or ABS/PC. Then a print image in accordance with the subsequent symbol 2 is applied to the component 1. In this regard, the symbol is formed from a material that cannot be electroplated. Preferably, the symbol is applied using a varnish that cannot be electroplated. Application of the symbol to the component 1 takes place by means of imprinting, for example.

In the exemplary embodiment according to FIG. 2, the print image is applied after the injection-molding procedure of the component 1. The pad printing method is used for this purpose.

This is a method in which the injection-molded parts are set into a suitable apparatus. Furthermore, the print image is taken up by a soft punch, generally referred to as a pad, from an etched or milled hollowed-out varnish storage area, the cliché, which is filled with varnish and scraped off before every work cycle, and transferred to the plastic component.

A further embodiment is application of the print image composed of varnish that cannot be electroplated in the manner of a hot-embossed film. In this regard, a print image previously imprinted onto a carrier film is released from the film by means of temperature and pressure and transferred to the component. After cooling of the component, the symbol is raised on the component, because the layer that represents the symbol is deposited there and adheres there. In this regard, the thickness of the applied layer of the symbol amounts to between 1 μm and 15 μm.

After imprinting and cleaning of the outer print edges by means of a subsequent laser process, the components, with the non-electroplatable layer that forms the subsequent symbol, are passed to electroplating. Electroplating takes place in known manner, by chemical and electrochemical deposition of multiple metal layers, which is conventionally concluded with a decorative layer composed of chromium. These metal layers hold without problems, as a composite, on the components composed of plastic that can be electroplated, particularly ABS or ABS/PC.

Only the regions provided with the print image are not coated with metal, so that the symbol can be recognized because of the differently colored background of the component. Furthermore, the possibility exists of producing a backlit component in this manner, as well, in that the rear side is kept free of metal or reworked to be free of metal.

The invention claimed is:

1. A method for producing an electroplated component, the method comprising:
    injection-molding a component from plastic that can be electroplated, the component having a front side and a rear side;
    imprinting a symbol onto the front side of the component from a varnish system that cannot be electroplated and is stable to electroplating;
    electroplating a decorative coating onto the front side of the component and leaving the rear side of the component free of a metal coating; and
    burning outer contours of the symbol via a laser beam such that the symbol includes a clean line.

2. The method according to claim 1, wherein the imprinting is applied by a pad printing method.

3. The method according to claim 1, wherein the imprinting is applied by hot embossing.

* * * * *